US012753827B2

(12) United States Patent
Godfrey et al.

(10) Patent No.: US 12,753,827 B2
(45) Date of Patent: Oct. 6, 2026

(54) GEARBOX FOR A POWERED RUNNING BOARD

(71) Applicant: Magna Exteriors Inc., Aurora (CA)

(72) Inventors: Jerry Godfrey, Schomberg (CA); Desmond P. Jamieson, Toronto (CA); V-Bond Lee, Newmarket (CA)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 19/117,899

(22) PCT Filed: Dec. 19, 2023

(86) PCT No.: PCT/CA2023/051704
§ 371 (c)(1),
(2) Date: Apr. 2, 2025

(87) PCT Pub. No.: WO2024/130403
PCT Pub. Date: Jun. 27, 2024

(65) Prior Publication Data

US 2026/0126100 A1 May 7, 2026

Related U.S. Application Data

(60) Provisional application No. 63/434,321, filed on Dec. 21, 2022.

(51) Int. Cl.

| | |
|---|---|
| ***B60R 3/02*** | (2006.01) |
| ***F16H 19/08*** | (2006.01) |
| ***F16H 57/039*** | (2012.01) |
| *B60R 3/00* | (2006.01) |
| *F16H 55/06* | (2006.01) |

(52) U.S. Cl.
CPC ............... *F16H 19/08* (2013.01); *B60R 3/02* (2013.01); *F16H 57/039* (2013.01); *B60R 3/002* (2013.01); *F16H 2055/065* (2013.01)

(58) Field of Classification Search
CPC ... B60R 3/02; B60R 3/002; F16H 1/16; F16H 1/166; F16H 1/125; F16H 2025/209; F16H 2055/065; F16H 55/22; F16H 2057/0213
See application file for complete search history.

(56) References Cited

U.S. PATENT DOCUMENTS

| | | | | |
|---|---|---|---|---|
| 7,118,120 | B2 * | 10/2006 | Lee | B60R 3/002 280/166 |
| 2022/0258672 | A1 * | 8/2022 | Peterson | B60R 1/28 |
| 2022/0349462 | A1 * | 11/2022 | Plesniak | F16H 57/039 |

FOREIGN PATENT DOCUMENTS

| | | | | | |
|---|---|---|---|---|---|
| DE | 102009005346 | A1 * | 7/2010 | | F16H 1/16 |
| KR | 20180076873 | A * | 7/2018 | | F16H 21/16 |
| KR | 101961697 | B1 * | 3/2019 | | F16H 1/16 |

* cited by examiner

*Primary Examiner* — Bobby Rushing, Jr.

(57) ABSTRACT

An improved gearbox for use with a vehicle running board system. The improved gearbox includes an actuator having a rotating shaft. A first stage gear is connected to a first end of the rotating shaft of the actuator. An overmolded transfer gear in rotatable engagement with the first stage gear. There is a second stage screw shaft having a gear portion in rotatable engagement with the overmolded transfer gear, and an output end for providing output force from an improved gearbox. The overmolded gear provides reduced vibration and distributes contact stress between the overmolded gear and the first stage gear and the gear portion of the second stage screw shaft.

23 Claims, 6 Drawing Sheets

GEARBOX FOR A POWERED RUNNING BOARD

FIELD OF THE INVENTION

The present invention relates to an improved actuator for a powered running board arrangement.

BACKGROUND OF THE INVENTION

In the field of running boards for vehicles, there are certain model types, called automatic running boards which are retractable and move between a deployed a stowed position. The movement of the automatic running board in some applications is accomplished using a motor or actuator, which transfers force to the running boards using gears. One problem that has been encountered is that shaft retention of the gear train was not adequate to prevent shaft misalignment resulting in excessive noise. This becomes more evident over the years when the loads driven by the motor increased due to the deployment of larger step platforms. In addition, the prior art did not state any effective methods of retaining the screw shaft, to prevent misalignment and shaft deflection due to high loads. The resulting deflections caused non-conjugate motion between the two gears during operation which effectively led to noise issues. There is a need to develop a method to stiffen the shaft to prevent deflection and misalignment. Reduce contact pressures between the gears as it is a primary source of noise, vibration and harshness (NVH). It is further desirable to ensure that conjugated action is maintained in the worm gear during all combinations of loads.

Previously, radial ball bearings were placed on each side of the shaft and were used to resist the loads produced by the drive unit. The ball bearings did not meet durability requirements and did not mitigate the deflection enough which resulted in gear misalignment. Normal helical gears were used in the prior art which caused high contact stresses reducing gear durability. It is desirable to provide a gearbox that utilizes different types of bearings to stiffen the shaft. The new embodiment of the gearbox will enable the shafts to retain axial deflection. Contact pressure shall be reduced by utilizing enveloping gears.

SUMMARY OF THE INVENTION

The present application is directed to an improved gearbox for use with a vehicle running board arrangement. The improved gearbox includes an actuator having a rotating shaft. A first stage gear is connected to a first end of the rotating shaft of the actuator. An overmolded transfer gear in rotatable engagement with the first stage gear. There is a second stage screw shaft having a gear portion in rotatable engagement with the overmolded transfer gear, and an output end for providing output force from an improved gearbox. The overmolded gear provides reduced vibration and distributes contact stress between the overmolded gear and the first stage gear and the gear portion of the second stage screw shaft.

In order to reduce noise, vibration and harshness (NVH) effects there is an angular contact bearing rotatably supporting a first end of the second stage screw shaft. Also provided is a tapered roller bearing rotatably supporting the second stage screw shaft. The tapered roller bearing is positioned at a distance away from the angular contact bearing along the axis of the second stage screw shaft. In another embodiment of the invention the tapered roller bearing is replaced with a second angular contact bearing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 5:
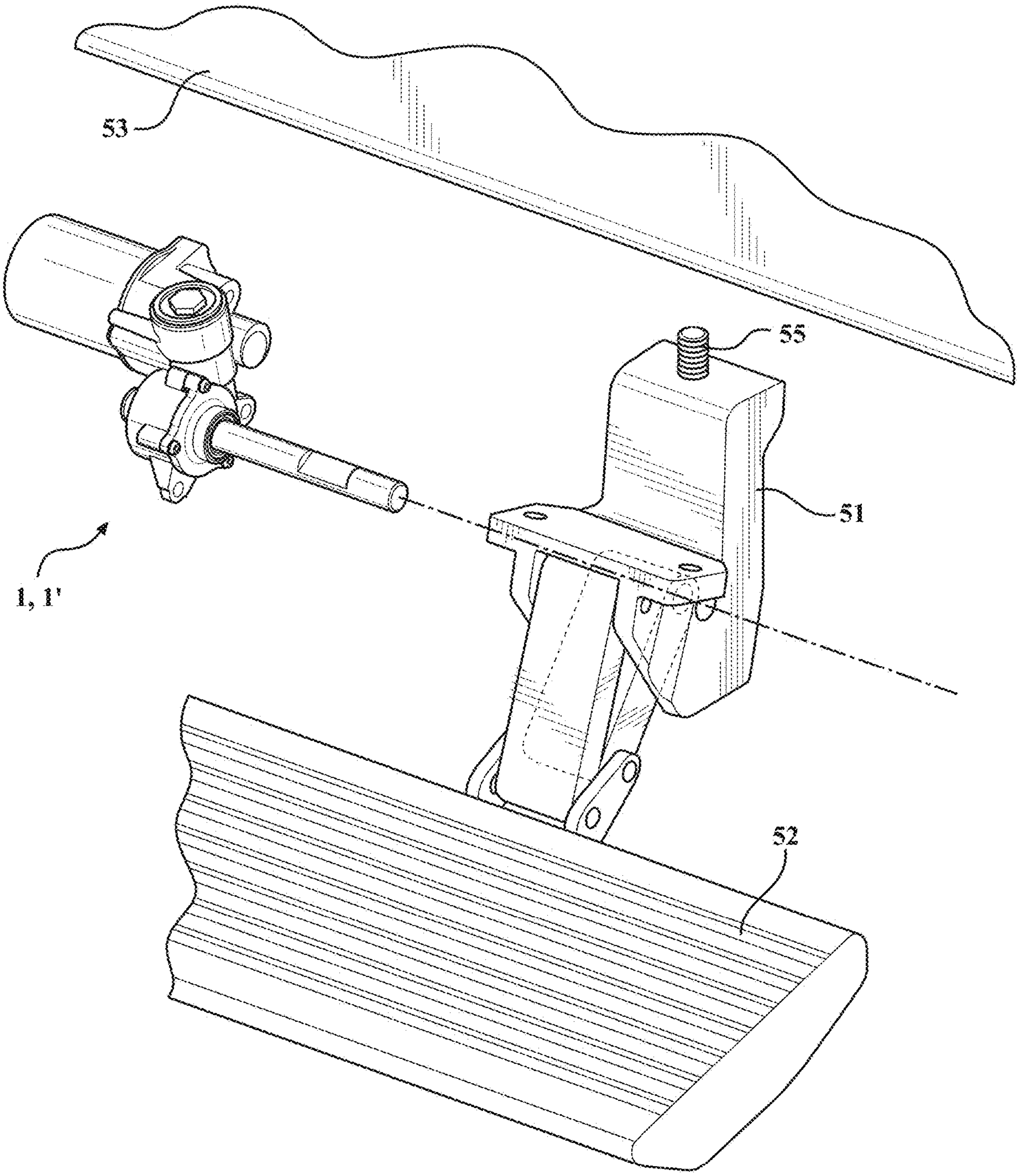
FIG. 5 is a side perspective view of a vehicle step connected to a bracket with the gearbox connected.

Referring now to FIG. 5 a gearbox 1, 1' having an output shaft 24,24' is shown connected to a bracket 51. The bracket 51 is connected to a step, which can be a vehicle bed step or running board. The bracket 51 is mountable to a surface of a vehicle 53 using a fastener 55 or other suitable connection. The surface is typically the frame of the vehicle 53, however, it is within the scope of this invention for the surface to be another surface other than the frame of the vehicle 53. The output shaft 24, 24' of the gearbox 1, 1' is connected to the bracket 51 and is able to move the bracket 51 between a retracted position, where the step 52 is stowed inboard, near or against the underside of the vehicle 53, and an extended position, where the step 52 is moved to a position away and outboard of the vehicle 53.

Figure 1:
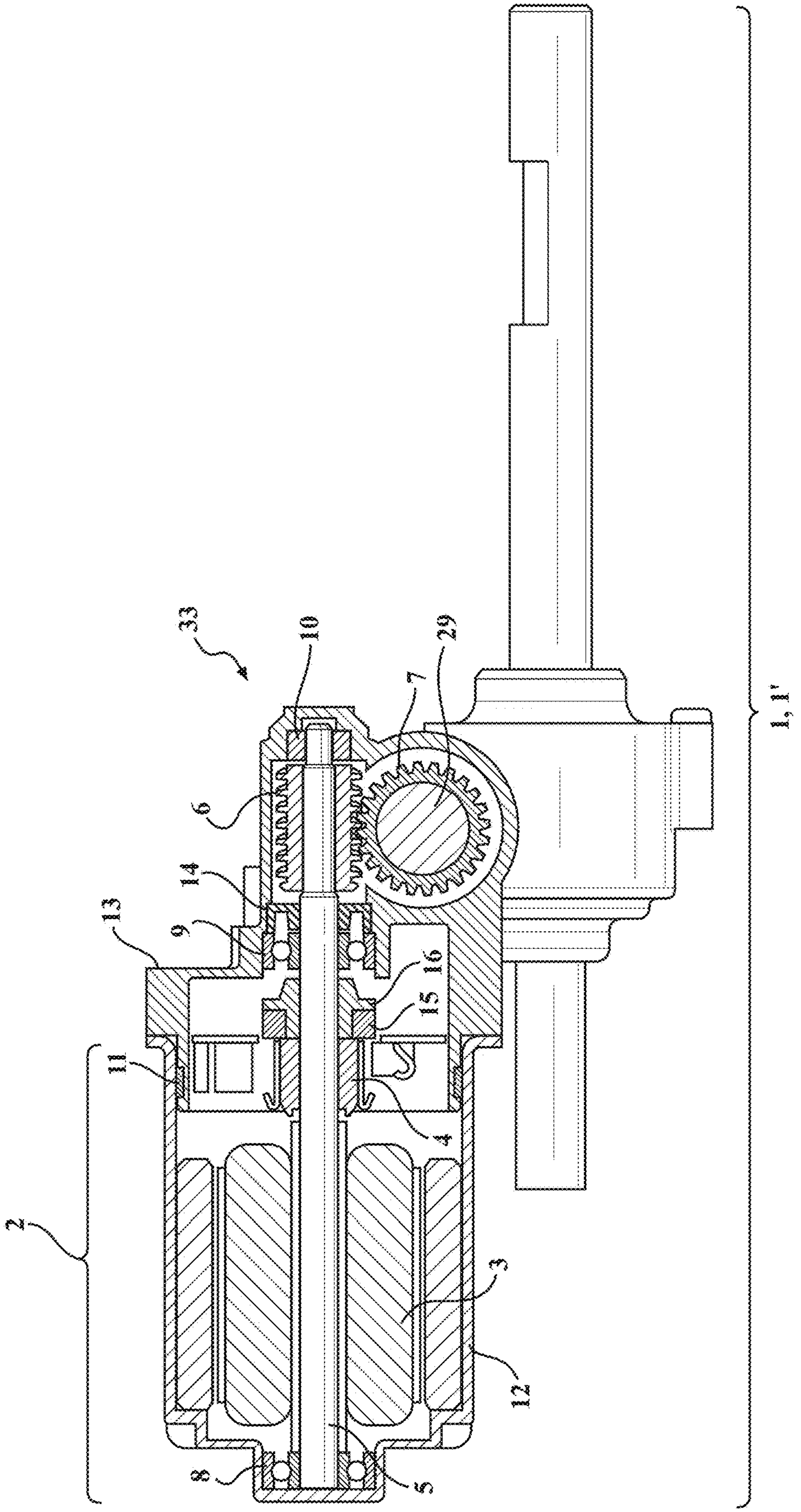
FIG. 1 is a cross-sectional top plan view of a first stage of a gearbox according to a first embodiment of the present invention.
Figure 2A:
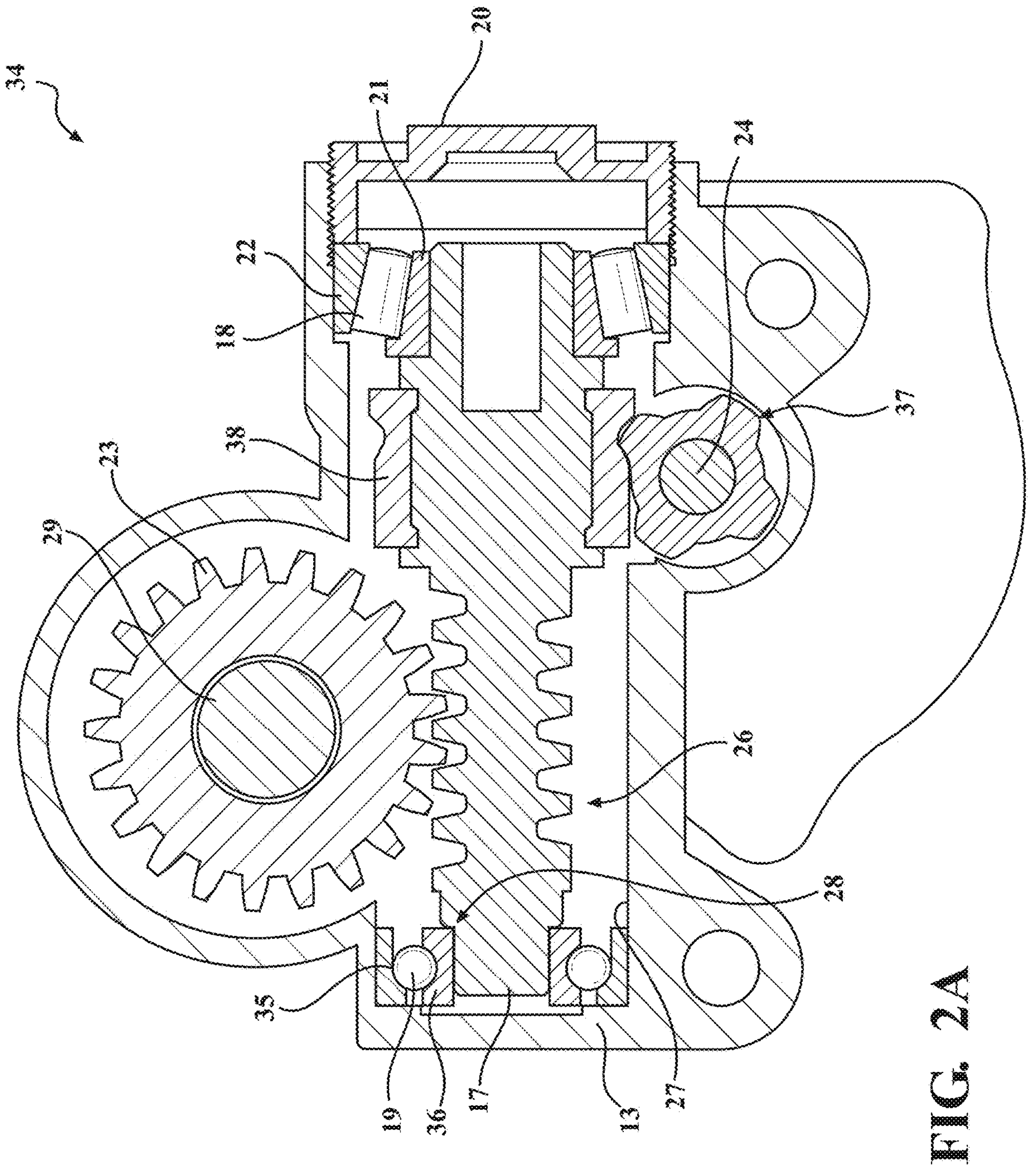
FIG. 2A is a cross-sectional top plan view of a second stage of the gearbox according to a first embodiment of the present invention.
Figure 2B:
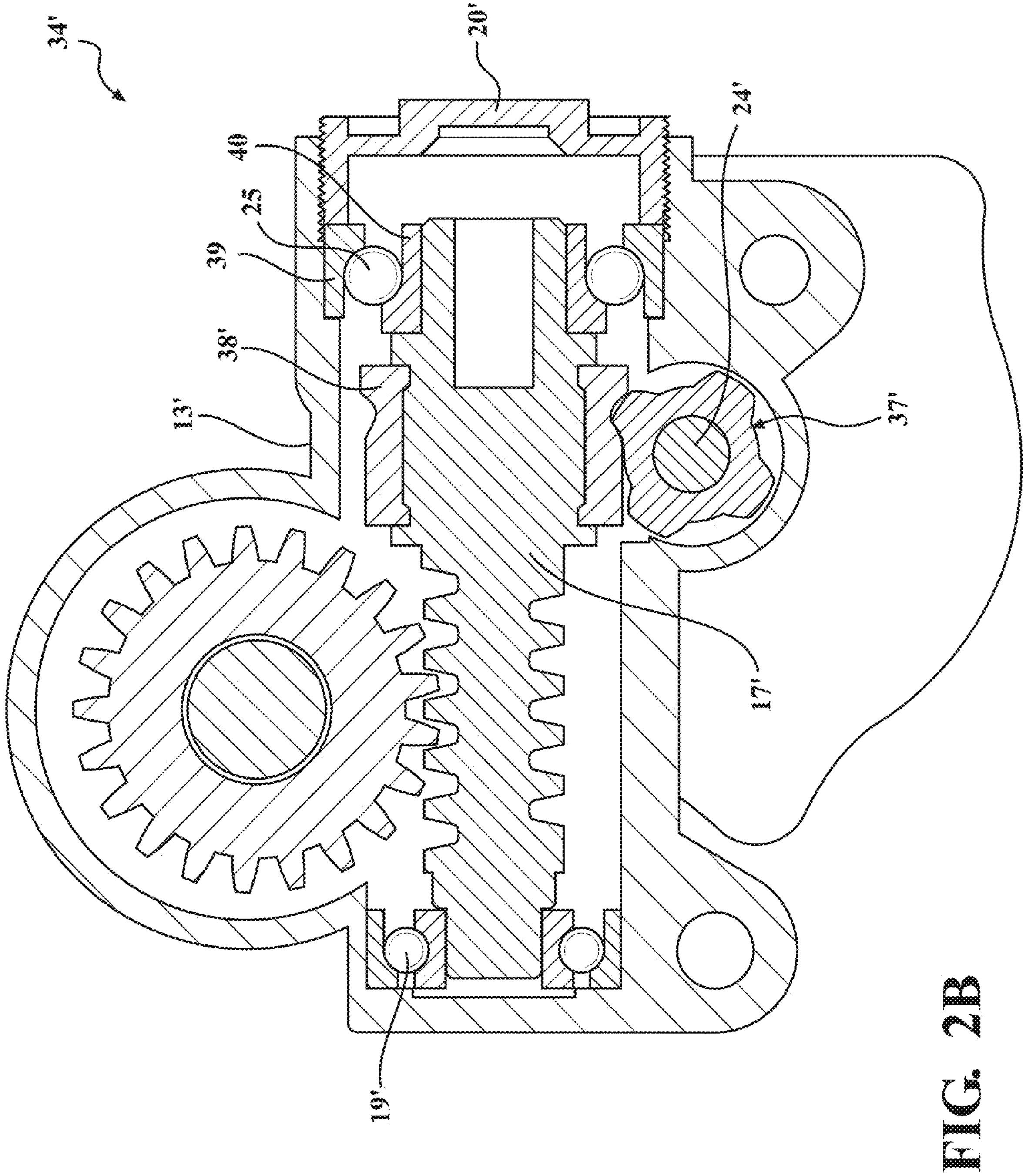
FIG. 2B is a cross-sectional top plan view of a second stage of a gearbox according to a second embodiment of the present invention.

The gearbox 1, 1' consists of two stages of gears, where a first stage 33 is shown in FIG. 1, and a second stage 34, 34' is shown in FIGS. 2A and 2B. In FIG. 1, an actuator 2 comprises an armature 3 and a commutator 4 that rotate a shaft 5 through an electromagnetic force. The shaft 5 drives the first stage of gears which includes a first-stage gear 6 (e.g. shown as a worm gear), and an overmolded transfer gear 7 meshed with the first stage gear 6 and transfers the load from the first stage 33 to the second stage 34, 34'. The shaft 5 is supported by two bearings 8, 9 and a bushing 10. There is a seal 11 between a motor can 12 and a housing 13 that prevents external agents from entering the motor can 12 and causing damage to the internal parts of the actuator 2. There is an oil seal 14 that prevents grease migration from the gears to the actuator 2, thereby preventing a short circuit from occurring. A ring magnet 15, which is used to measure the RPM of the shaft 5, is placed on a non-ferromagnetic ring magnet holder 16 so that magnetic interference does not occur. In this first embodiment, the overmolded transfer gear 7 is meshed with the first stage gear 6, which may be an enveloping worm gear, which spreads the contact stresses allowing an overmolded plastic gear to manage the high loads during operation.

Referring now to FIG. 2A, a second stage screw shaft 17 is supported by a tapered roller bearing 18 on one end and an angular contact bearing 19 at a second end. The second stage screw shaft 17 has a gear portion 26 (i.e., worm gear, which may be an enveloping worm gear) that is engaged with a second stage gear 23, which is driven by the overmolded transfer gear 7, thereby transferring forces from the first stage 33 to the second stage 34. It is also within the scope of this invention for the second stage gear 23 to be overmolded and connected to a common shaft 29, to which the overmolded transfer gear 7 is also connected. However, it is within the scope of this invention for the overmolded transfer gear 7, second stage gear 23 and common shaft 29 to be integrated for formed as one piece.

A threaded end cap 20 provides a compressive load to the second stage screw shaft 17 to prevent axial end play and vibrations and reduce NVH effects. Pressure or compressive force is applied by tightening the threaded cap 20 against a cup 22 of the tapered roller bearing 18, which also loads the angular contact bearing 19 and subjects the tapered roller bearing 18 and angular contact bearing 19 to a preload which will increase the screw shaft's ability 17 to resist bending and reduce deflection induced by the gear meshing action.

The angular contact bearing 19 has an outer ring 35 press fit to the housing 13 and an inner ring 36 having a slip fit or a slight press fit to the second stage screw shaft 17. The selection of the angular contact bearing 19, as opposed to other bearing types, is due to its high axial load capability which enables a press fit during assembly without damaging the bearing. The tapered roller bearing 18 has a cone 21 that is press fit to the second stage screw shaft 17. The tapered roller bearing 18 also has the cup 22 that is press fit to the housing 13. The second stage screw shaft 17 is inserted into the gear housing 13 and the journal is slightly press fit or slip fit into an inner diameter 27 of the housing 13 forming a bore for receiving the angular contact bearing 19. The threaded end cap 20 is fastened into the housing 13 to compress the cup 22 of the tapered roller bearing 18, which compresses the cone 21 of the tapered roller bearing 18. The cone 21 of the tapered roller bearing 18 transmits the compressive pre-load to the angular contact bearing 19 through a shoulder 28 of the second stage screw shaft 17, which constrains the axial degree of freedom of the second stage screw shaft 17, along a longitudinal axis of the second stage screw shaft 17. The second stage gear 23 is assembled into the housing 13 and meshes with the worm gear portion 26 of the second stage screw shaft 17 after assembly.

Figure 3:
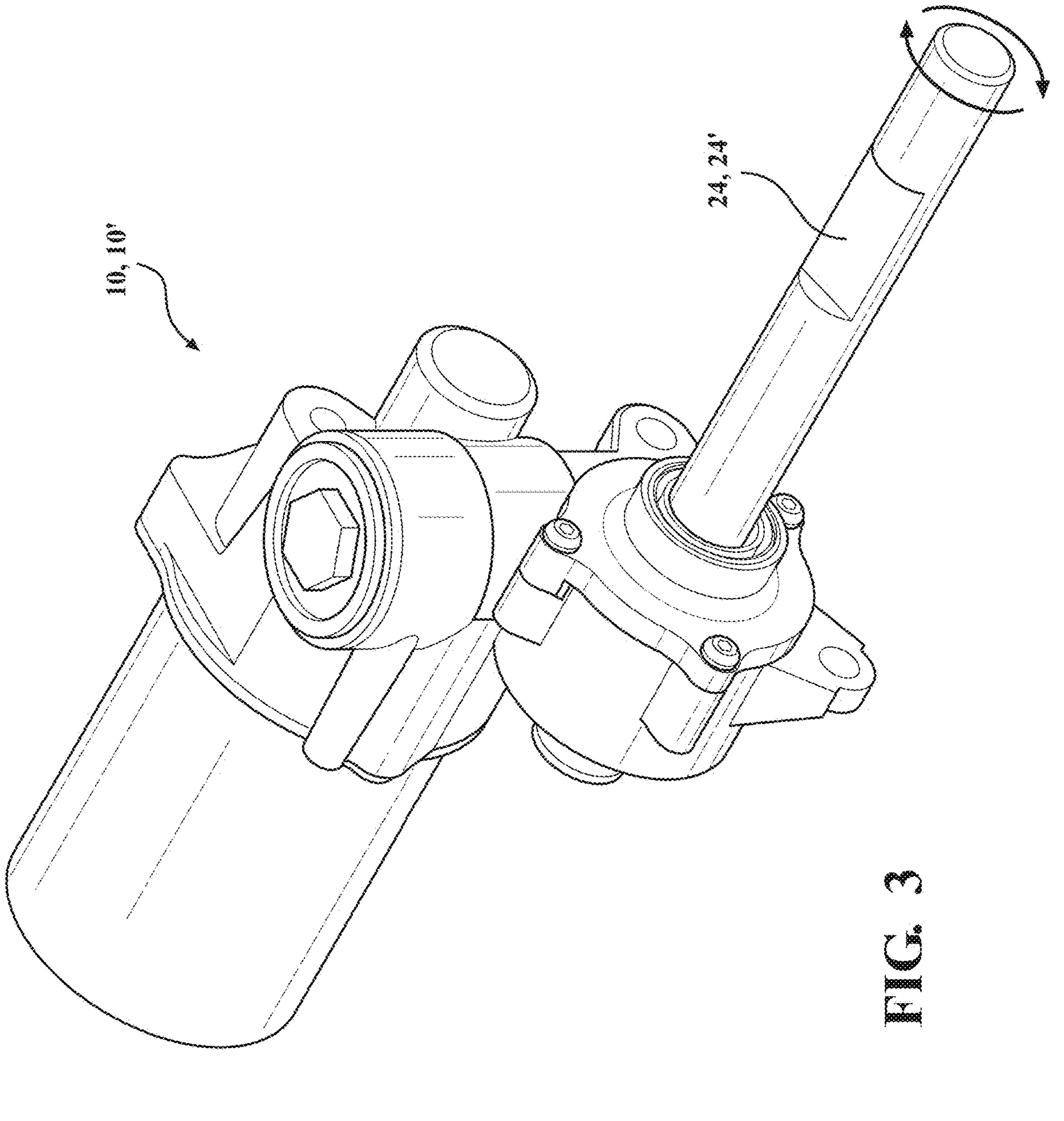
FIG. 3 is a top side perspective view of the gearbox.
Figure 4:
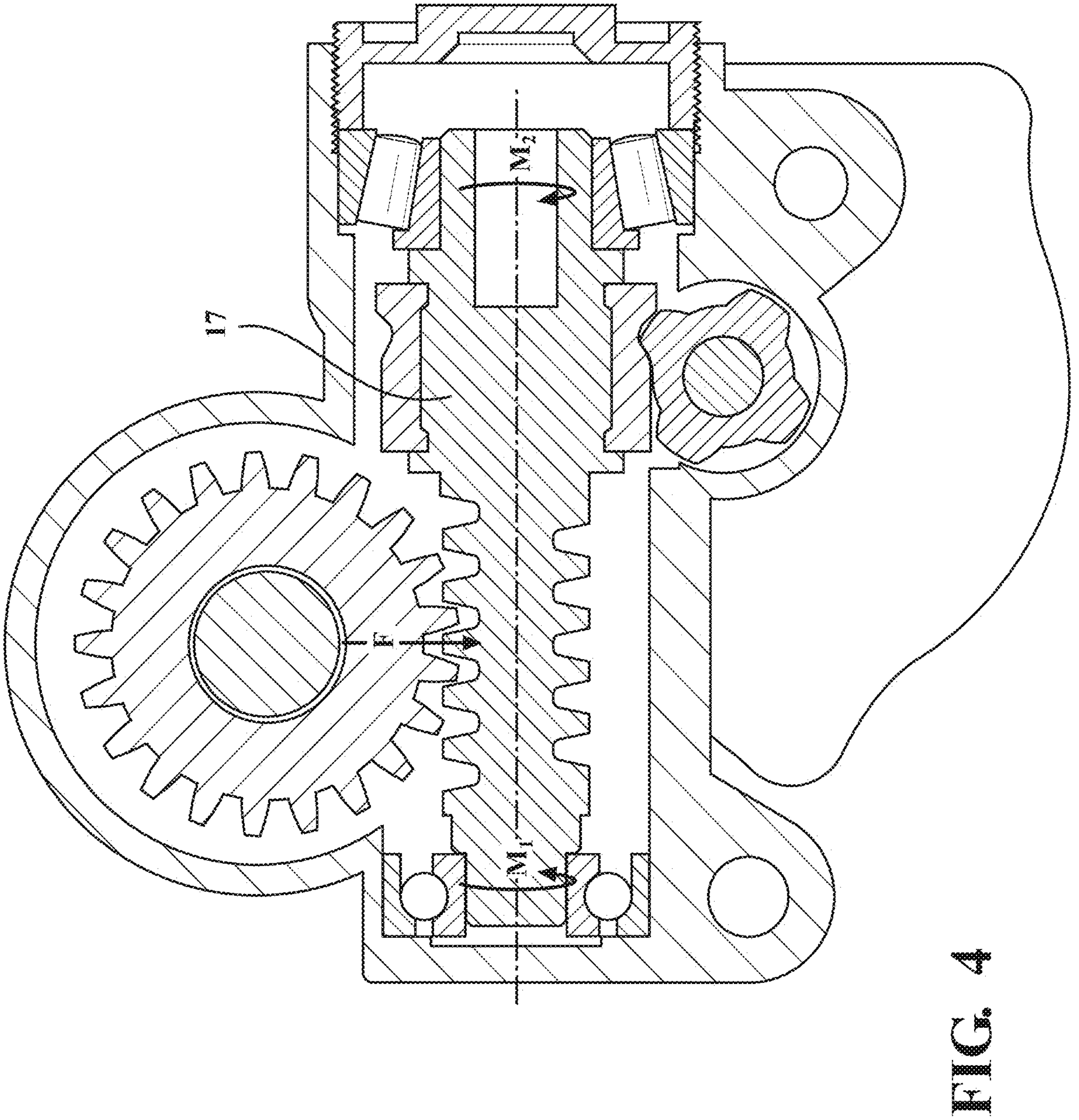
FIG. 4 is a cross-sectional top plan view of the second stage of the gearbox of the first embodiment, with reference arrows showing the movement of the various components.

The output shaft 24 shown in FIGS. 2A and 3 is connected to a driven gear 37 that is rotatably positioned within the second stage 34. The driven gear 37 is in mesh engagement to a drive gear 38 that is connected to and rotates with the second stage screw shaft 17. The advantage of the embodiment shown in FIG. 2A is that the tapered roller bearing 18 and angular contact bearing 19 allow the gear box 1 to support larger axial loads, thereby lowering NVH effects. The addition of the tapered roller bearing 18 and angular contact bearing 19 improve resistance of movement the output shaft 24 (shown in FIG. 3), which results in low shaft deflection. In contrast with using other types of bearings (i.e., ball bearings), when the shaft (equivalent to screw shaft 17 showing in FIG. 2A) is in a deflected state the angle of contact between the gears results in a loss of self-locking capability and thus the system will back drive, which is undesirable. In the embodiment of the invention shown in FIGS. 2A, the second stage screw shaft 17 acts as a spacer which is captured in between the tapered roller bearing 18 and angular contact bearing 19 in compression. The result is that the second stage screw shaft 17 deflections are reduced resulting in a self-lock that is maintained under high load conditions, thereby preventing unwanted back driving, which are produced when an external force is exerted on the output shaft 24 as seen in FIG. 3. The embodiment shown in FIGS. 2A and 4, resists back drive loads by resisting the bending moments generated on the second stage screw shaft 17 due to the gear separation forces M1, M2, F as seen in FIG. 4. As a result, there is little gear deflection, which maintains the helix angle of the gears in contact and sustains a permanent self-lock in the gearbox 1.

FIGS. 2B and 3 depict another embodiment of a second stage 34' of a gearbox 1' according to a second embodiment of the invention. In this embodiment an angular contact bearing 25 replaces the tapered roller 18 of the first embodiment shown in FIG. 2A and performs the same function as shown in FIG. 4. The angular contact bearing 25 has an outer race 39 press fit to a housing 13' and an inner race 40 that supports a second stage screw shaft 17'. A second end of the second stage screw shaft 17' is connected to an angled contact bearing 19' that is connected to the housing 13' and second stage screw shaft 17' in the same way as angled contact bearing 19 described above.

The gearbox 1' further includes a threaded end cap 20' that contacts the outer race 39 and provides compressive force on the angular contact bearing 25, which is also transferred through the second stage screw shaft 17' to the angular contact bearing 19', which stiffens the second stage screw shaft 17' and minimizes deflection. Minimum shaft deflection provides continuous conjugate motion between the gears which reduces NVH. The gearbox 1' retains the self-locking feature by minimizing the change in the helix angle of the gears during all combinations of loads. An enveloping gear 6, 26 is implemented to mitigate the contact pressure between the gears allowing plastic gears to be used. The output shaft 24' shown in FIGS. 2B and 3 is connected to a driven gear 37' that is rotatably positioned within the second stage 34'. The driven gear 37' is in mesh engagement to a drive gear 38' that is connected to and rotates with the second stage screw shaft 17'.

The advantage of the embodiment shown in FIG. 2B is that the angular contact bearing 25 and angular contact bearing 19 allow the gear box 1' to support larger axial loads, thereby lowering NVH effects. The addition of the angular contact bearing 25 and angular contact bearing 19 improve resistance of movement of the output shaft 24' (shown in FIG. 3), which results in low shaft deflection. In contrast with using other types of bearings (i.e., ball bearings), when the shaft (equivalent to screw shaft 17' showing in FIG. 2B) is in a deflected state the angle of contact between the gears results in a loss of self-locking capability and thus the system will back drive, which is undesirable. In the embodiment of the invention shown in FIGS. 2B, the second stage screw shaft 17' acts as a spacer which is captured in between the angular contact bearing 25 and angular contact bearing 19 in compression. The result is that the second stage screw shaft 17' deflections are reduced resulting in a self-lock that is maintained under high load conditions, thereby preventing unwanted back driving, which are produced when an external force is exerted on the output shaft 24' as seen in FIG.

3. The embodiment shown in FIGS. 2B, resists back drive loads by resisting the bending moments generated on the second stage screw shaft 17' due to the gear separation forces M1, M2, F. As a result, there is little gear deflection, which maintains the helix angle of the gears in contact and sustains a permanent self-lock in the gearbox 1'.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gearbox for a vehicle step, comprising:
an actuator having a rotating shaft;
a first stage of the gearbox having a first stage gear that is connected to the rotating shaft;
an overmolded transfer gear in rotatable engagement with the first stage gear, and
a second stage of the gearbox containing a second stage screw shaft having a gear portion in rotatable engagement with a second stage gear and a drive gear that rotates with the second stage screw shaft and is engaged to a driven gear for providing output force from the gearbox, wherein the overmolded gear is connected to a common shaft and the common shaft is connected to the second stage gear for transferring force from the first stage to the second stage.

2. The gearbox of claim 1 further comprising:
an angular contact bearing rotatably supporting a first end of the second stage screw shaft;
a tapered roller bearing rotatably supporting a second end of the second stage screw shaft, wherein the angular contact bearing and the tapered roller bearing are positioned along the axis of the second stage screw shaft.

3. The gearbox of claim 2 wherein the gear portion of the second stage screw shaft is an enveloping worm gear.

4. The gearbox of claim 2 further comprising:
a housing of the gearbox and a threaded end cap connected to the housing, wherein the threaded end cap contacts a cup of the tapered roller bearing and provides compressive force on the tapered roller bearing, the second stage screw shaft and the angular contact bearing.

5. The gearbox of claim 4 further comprising:
wherein the cup of the tapered roller bearing is press fit to the housing, and
a cone of the tapered roller bearing that is press fit to the second stage screw shaft.

6. The gearbox of claim 5 further comprising:
an outer ring of the angular contact bearing press fit to the housing, and
an inner ring of the angular contact bearing having a slip fit to the second stage screw shaft.

7. The gearbox of claim 1 further comprising:
an output shaft having one end connected to a bracket that is connected to a step and a second end extending into the second stage of the gearbox and being connected to the driven gear.

8. The gearbox of claim 7 wherein the bracket is connected to a vehicle.

9. The gearbox of claim 1 further comprising:
a first angular contact bearing rotatably supporting a first end of the second stage screw shaft;
a second angular contact bearing rotatably supporting a second end of the second stage screw shaft, wherein the first angular contact bearing and the second angular contact bearing are positioned along the axis of the second stage screw shaft.

10. The gearbox of claim 9 wherein the gear portion of the second stage second stage screw shaft is an enveloping worm gear.

11. The gearbox of claim 9 further comprising:
a housing of the gearbox and a threaded end cap connected to the housing, wherein the threaded end cap contacts an outer race of the second angular contact bearing and provides compressive force on the second angular contact bearing, the second stage screw shaft and the first angular contact bearing.

12. The gearbox of claim 9 further comprising:
wherein the outer race of the second angular contact bearing is press fit to the housing, and
an inner race of the second angular contact bearing that contacts and supports the second stage screw shaft.

13. The gearbox of claim 12 further comprising:
an outer ring of the first angular contact bearing press fit to the housing, and
an inner ring of the first angular contact bearing having a slip fit to the second stage screw shaft.

14. A gearbox for a vehicle step comprising:
an actuator having a rotating shaft;
a first stage of the gearbox wherein the rotating shaft of the actuator extends into the first stage and a first stage gear connected to a first end of the rotating shaft;
an overmolded transfer gear in rotatable engagement with the first stage gear;
a second stage of the gearbox containing a second stage screw shaft having a gear portion in rotatable engagement with a second stage gear and a drive gear engaged to a driven gear for providing output force from the gearbox, wherein the overmolded gear is connected to the second stage gear for transferring force from the first stage to the second stage, and the overmolded gear and the second stage gear provide reduced vibration and contact stress is distributed between the overmolded gear and the first stage gear and the second stage gear and the gear portion of the second stage screw shaft;
an output shaft having one end connected to a bracket that is connected to a step and a second end extending into the second stage of the gearbox and being connected to the driven gear, wherein the bracket is connected to a vehicle;
an angular contact bearing rotatably supporting a first end of the second stage screw shaft; and
a tapered roller bearing rotatably supporting a second end of the second stage screw shaft, wherein the angular contact bearing and the tapered roller bearing are positioned along the axis of the second stage screw shaft, wherein the second stage gear is connected to a common shaft and the overmolded transfer gear is connected to the common shaft.

15. The gearbox of claim 14 wherein the gear portion of the second stage screw shaft is an enveloping worm gear.

16. The gearbox of claim 14 further comprising:
a housing of the gearbox and a threaded end cap connected to the housing, wherein the threaded end cap contacts a cup of the tapered roller bearing and provides compressive force on the tapered roller bearing, the second stage screw shaft and the angular contact bearing.

17. The gearbox of claim 16 further comprising:
wherein the cup of the tapered roller bearing is press fit to the housing, and a cone of the tapered roller bearing that is press fit to the second stage screw shaft.

18. The gearbox of claim 17 further comprising:
an outer ring of the angular contact bearing press fit to the housing, and
an inner ring of the angular contact bearing having a slip fit to the second stage screw shaft.

19. The gearbox of claim 14 further comprising:
a first angular contact bearing rotatably supporting a first end of the second stage screw shaft;
a second angular contact bearing rotatably supporting a second end second stage screw shaft, wherein the first angular contact bearing and the second angular contact bearing are positioned along the axis of the second stage screw shaft.

20. The gearbox of claim 19 wherein the gear portion of the second stage screw shaft is an enveloping worm gear.

21. The gearbox of claim 19 further comprising:
a housing of the gearbox and a threaded end cap connected to the housing, wherein the threaded end cap contacts an outer race of the second angular contact bearing and provides compressive force on the second angular contact bearing, the second stage screw shaft and the first angular contact bearing.

22. The gearbox of claim 19 further comprising:
wherein the outer race of the second angular contact bearing is press fit to the housing, and
an inner race of the second angular contact bearing that contacts and supports the second stage screw shaft.

23. The gearbox of claim 21 further comprising:
an outer ring of the first angular contact bearing press fit to the housing, and
an inner ring of the first angular contact bearing having a slip fit to the second stage screw shaft.

* * * * *